Patented Dec. 26, 1922.

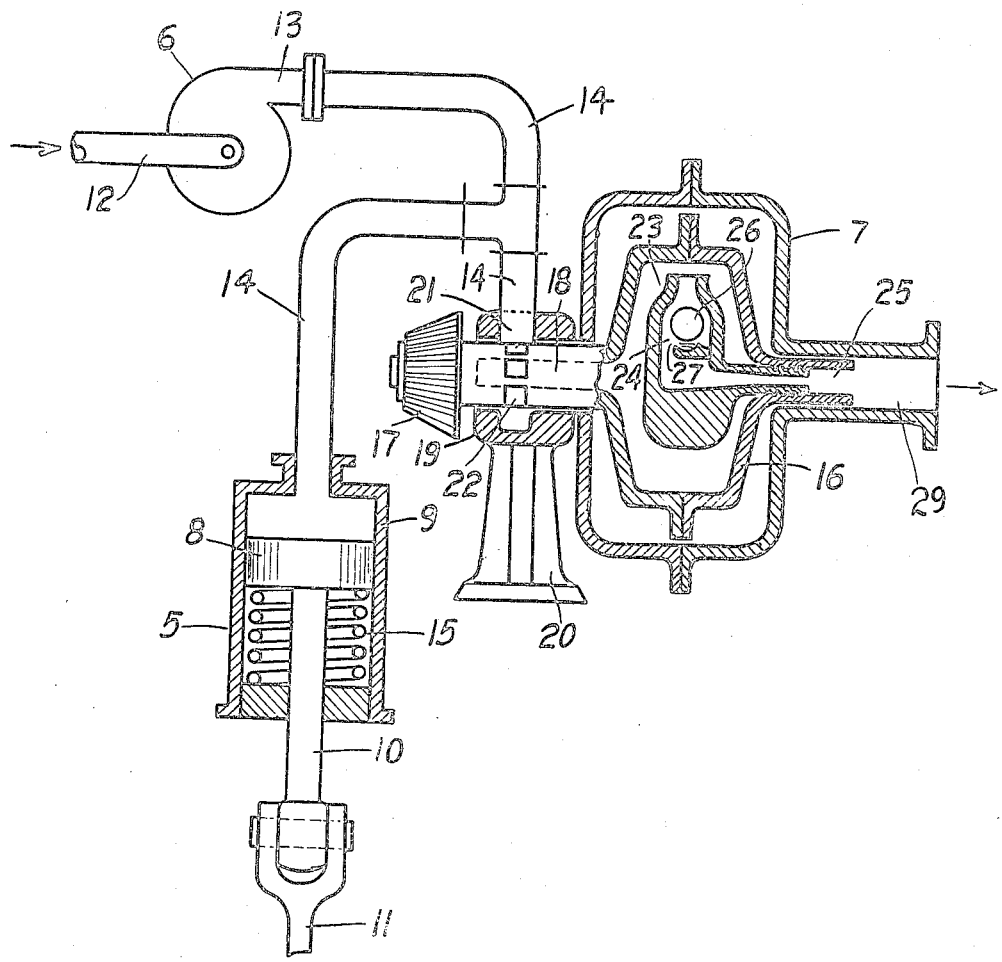

1,440,224

UNITED STATES PATENT OFFICE.

ALEXANDER T. KASLEY, OF TINICUM TOWNSHIP, DELAWARE COUNTY, PENNSYLVANIA, ASSIGNOR TO WESTINGHOUSE ELECTRIC & MANUFACTURING CO., A CORPORATION OF PENNSYLVANIA.

GOVERNING MECHANISM.

Application filed August 8, 1919. Serial No. 316,236.

*To all whom it may concern:*

Be it known that I, ALEXANDER T. KASLEY, a citizen of the United States, and a resident of Tinicum Township, in the county of Delaware and State of Pennsylvania, have made a new and useful Invention in Governing Mechanism, of which the following is a specification.

This invention relates to governing mechanism, and has for an object to produce a governing mechanism for engines and similar apparatus which is simpler in construction and at the same time as positive and reliable in operation as apparatus now in use and known to me.

A further object is to produce a new and improved governing mechanism of the fluid pressure type in which the pressure of the governing fluid is controlled by variations in centrifugal force.

These and other objects which will be made apparent throughout the further description of my invention, are attained by means of apparatus embodying the features herein described and illustrated in the drawings accompanying and forming a part thereof.

The drawing is a diagrammatic sectional view of a governing mechanism embodying my invention.

My invention consists in providing an element, such as a piston, which is capable of moving in response to variations in fluid pressure, for the purpose of controlling a valve or other governing device. This element is located in a pressure system to which fluid under constant pressure is delivered, but in which the degree of pressure is controlled by a speed responsive device, such, for example, as a centrifugal weight. The speed responsive device is responsive to variations in the speed of the apparatus to be governed and is adapted to control the discharge of fluid from the pressure system and in this way to control the pressure in the system and the position of the valve or other governing device.

In the drawing I have illustrated a governing mechanism comprising a pressure responsive governing device 5, included in and forming a part of a fluid delivery system, a pump 6 for delivering fluid under pressure to said system, and a speed responsive device 7 for controlling the pressure of the fluid within said system. As shown, the pressure responsive device 5 includes a piston 8 which is adapted to operate in a cylinder 9 and to control the apparatus to be governed through the agency of a piston rod 10. The piston rod may be connected with the apparatus to be governed in any suitable manner, for example, by means of a link 11.

As illustrated, the pump 6 is provided with an inlet passage 12 and an outlet passage 13. The latter is shown as connected with the upper end of the cylinder 9 by means of a conduit 14 and consequently the pressure of the fluid delivered by the pump is transmitted to the upper side of the piston 8. The pressure of the fluid in the upper portion of the cylinder 9 is opposed by the force of a compression spring 15, which I have shown in the lower end of the cylinder. With this construction it is evident that the piston 8 assumes different positions in the cylinder 9 in accordance with variations in pressure of the fluid in the upper portion of the cylinder.

As illustrated, the conduit 14 connecting the pump 6 and the pressure responsive device 5, is also connected to the speed responsive device 7, consequently the pressure responsive device 5 and the speed responsive device 7 are subjected to substantially the same fluid pressure.

As shown, the speed responsive device 7 includes a rotatable casing 16 which is adapted to be driven by means of a bevel gear 17. The bevel gear is driven by the apparatus to be governed (not shown), consequently any variations in speed of the apparatus to be governed is accompanied by a similar variation in speed of the rotatable casing 16. As illustrated, the pinion 17 is connected to the rotatable casing 16 by means of a hollow shaft 18, which is supported by means of a bearing 19 and a pedestal 20. The hollow interior of the shaft 18 communicates with an annular chamber 21 within the bearing 19 by means of ports 22 in the shaft. As shown, the conduit 14 is in direct communication with the annular chamber 21, and hence with the interior of the rotatable casing 16.

As illustrated, the outlet from the rotatable casing 16 is formed within a discharge casing 23 which is rigidly mounted within the rotatable casing 16 and is provided with a radially extending passage 24. As shown, the radial passage 24 extends from a point near the periphery of the rotatable casing 16 to an axially extending discharge passage 25.

I have illustrated a ball valve 26 in the outer end of the radial passage 24 which controls the pressure within the rotatable casing 16, and hence within the conduit 14 and pressure responsive device 5. As shown, a suitable spring 27 is provided for maintaining the valve 26 in place when the apparatus is not in operation. If desired, the spring 27 may be made sufficiently strong to assist centrifugal force which tends to move the valve 26 to close the inlet of the passage 24 in opposition to the pressure of the fluid in the rotatable casing 16 when the apparatus is in operation.

As illustrated, a stationary casing encloses the rotatable casing 16 and is provided with an axially extending conduit 29 communicating directly with the axially extending discharge passage 25 of the rotatable casing 16.

In operation the pump 6 delivers fluid, such as oil, under pressure to the conduit 14, and hence to the pressure responsive governing device 5 and the speed responsive device 7. This pressure is sufficient if confined to force the piston 8 to the lower extremity of its travel against the opposed force of the spring 15.

The pressure within the system is controlled by the discharge valve 26. As the valve 26 is in the outer end of the discharge passage 24, it is subjected to centrifugal force when the casing 16 is rotated, the force tending to close the valve against the pressure of the fluid in the system. Obviously, the centrifugal force and hence the loading of the valve varies in accordance with variations in speed of the rotatable casing 16, which, of course, is driven by the apparatus to be governed. Consequently, the variations in speed of the apparatus to be governed are accompanied by proportional variations in the loading of the valve 26 and hence in the pressure of the fluid in the system and the position of the piston 8 of the governing device 5.

Governing mechanisms embodying the features of my invention may be made unusually simple and are reliable and effective in operation. The first cost is low, but the same high efficiency is obtained as with the ordinary oil relay governors now in use and well known to those skilled in the art.

While I have described and illustrated but one embodiment of my invention, it will be apparent to those skilled in the art that various changes, modifications, additions and omissions may be made in the apparatus described and illustrated without departing from the spirit and scope of the invention as set forth by the appended claims.

What I claim is:

1. A governing mechanism comprising a pressure system, means for delivering fluid under pressure to said system, an element movable in response to variations in pressure within said system for controlling the apparatus to be governed, and centrifugal means within the fluid discharge of the system responsive to variations in the speed of the apparatus to be governed for controlling the pressure within said system.

2. A governing mechanism comprising a pressure system communicating with a source of fluid pressure, an element movable in response to variations in pressure within said system for controlling the apparatus to be governed, and a valve responsive to centrifugal effects, within the fluid discharge of the system and responsive to variations in the speed of the apparatus to be governed, for controlling the discharge of fluid from said system.

3. A governing mechanism comprising a pressure system communicating with a source of fluid pressure, an element movable in response to variations in pressure within said system for controlling the operation of the apparatus to be governed, a rotatable discharge device for said system driven by the apparatus to be governed and a valve carried by said device and responsive in operation to variations in the speed thereof for controlling the discharge of fluid from said system.

4. A governing mechanism comprising a pressure system, a pump for delivering fluid under pressure to said system, a cylinder included in said system, a piston mounted in said cylinder and movable in response to variations in pressure within said system controlling the apparatus to be governed, a rotatable discharge device driven by the apparatus to be governed, and a valve carried by said device and subject to centrifugal force for controlling the discharge of fluid from said system.

In testimony whereof, I have hereunto subscribed my name this 7th day of August, 1919.

ALEXANDER T. KASLEY.

Witness:
WM. M. LETSCHE.